June 2, 1931.  E. FINSEN  1,808,346

CHUCK

Filed Sept. 26, 1928

INVENTOR
Eyvind Finsen
BY
ATTORNEY

Patented June 2, 1931

1,808,346

UNITED STATES PATENT OFFICE

EYVIND FINSEN, OF ROCHESTER, NEW YORK, ASSIGNOR TO GLEASON WORKS, OF ROCHESTER, NEW YORK, A CORPORATION OF NEW YORK

CHUCK

Application filed September 26, 1928. Serial No. 308,537.

The subject of the present invention is a chuck such as might be used upon a machine tool for holding a work-piece in position.

The primary object of this invention is to provide a chuck which will be efficient, simple in operation and construction, and of low cost.

A further object of this invention is to provide a chuck for use on machines for producing gears which may be employed on such a machine of a universal type capable of cutting gears of different cone angles and different cone distances.

Other objects of the invention will be apparent hereinafter from the specification and from the recital of the appended claims.

A preferred embodiment of the invention is illustrated in the accompanying drawings, in which.

Figures 1, 2, 3:
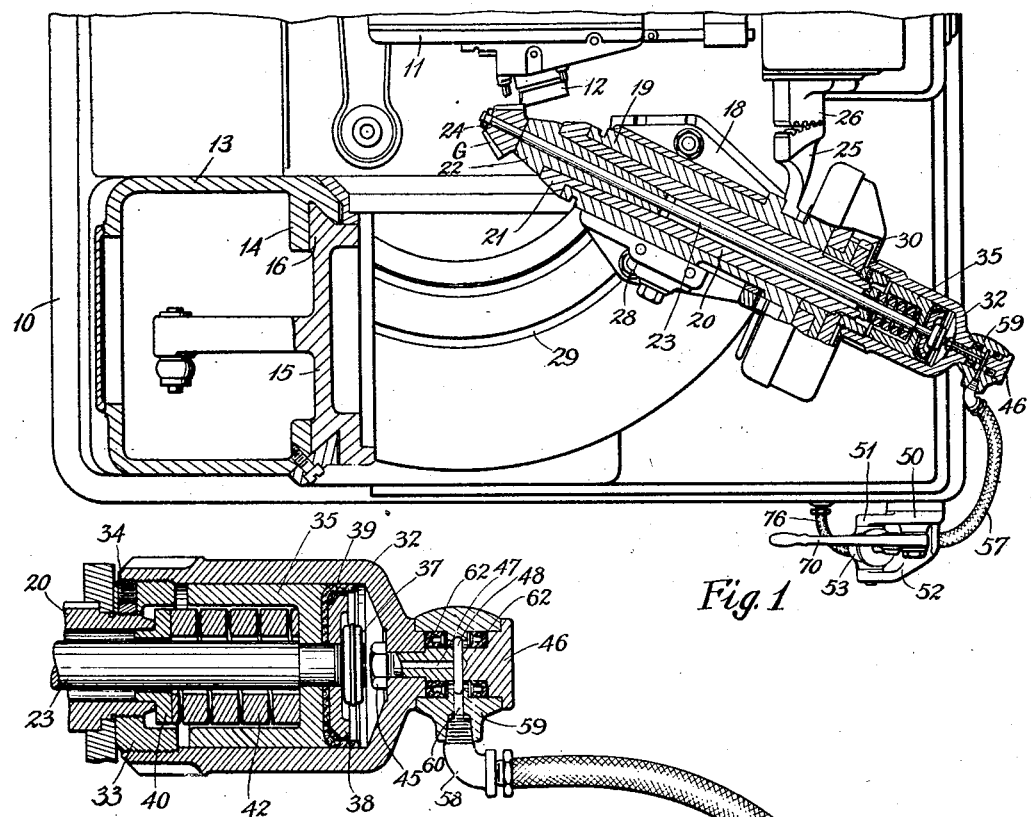
Figure 1 is a fragmentary plan view of a gear generating machine on which the chucking mechanism of the present invention is employed, parts being shown in section.
Figure 2 is a somewhat diagrammatic view illustrating the relationship of the parts for actuating the chuck to each other, certain of said parts being shown in section.
Figure 3 is a sectional view showing details of the check valve and its connections with the parts of the fluid system for actuating the chuck.

The present invention is shown as applied to an improved form of gear generating machine of the type described in the patent to James E. Gleason et al. No. 1,660,502 of February 28, 1928, but it will be understood that it is so shown for the purposes of illustration only that its construction, operation and object may be more readily understood and that it is not in any way to be considered as being limited to use on such a machine only.

The machine shown includes a bed or frame 10 on which is slidably mounted a tool head indicated generally at 11, which carries a pair of reciprocating tools, one of which is to be seen at 12 in the drawings. The frame 10 is provided at one end with an upright 13 which is provided with ways 14 which form guides for an oscillatory carrier or cradle 15 which is mounted upon the upright 13 and is provided with guide-rails 16 movable in the ways 14 of the upright. Mounted on the cradle 15 is a work head or support 18. Journaled in suitable bearings in this work head 18 is a sleeve 19. Within the sleeve 19 is rotatably mounted a second sleeve 20 which is provided with an enlarged inner end 21. The gear blank G to be cut is secured to this second sleeve 20 against movement relative thereto during cutting as by means of the arbor 22, the draw-rod 23, and a nut, horseshoe washer or other suitable securing means 24.

Secured to the sleeve 19 is a bevel gear segment 25 which meshes with a stationary gear segment 26 that is secured to the frame of the machine. The length of the arm carrying the bevel gear segment 25 will vary with the pitch cone angle of the gear to be cut and the work head 18 can be secured on the cradle 15 in the angular position required to bring the root surface of a tooth into the center line of the machine with the segments 25 and 26 in mesh by means of bolts 28 which engage in a circular T-slot 29 formed in the upper face of the cradle. As will be readily understood, when the cradle 15 is oscillated, the segment 25 will roll on the segment 26 and thereby rotate the sleeve 19. During the cutting of the teeth on the gear blank, the sleeves 19 and 20 are connected together by the elements of the indexing mechanism which are indicated generally at 30 and which are described more particularly in the patent above referred to. Through this connection, the rotary motion of the sleeve 19 is transmitted to the gear blank G which motion is combined with the movement of the cradle to produce a rolling motion of the blank G relative to the cutting tools 12, whereby teeth may be generated upon the blank.

The present invention relates to chucks and the elements of the particular gear cutting machine illustrated have been described simply that the application of the invention shown may be more readily understood. The construction and operation of my improved chucking mechanism will now be described.

Secured to the sleeve 20 at its outer end is a cylinder 32 which is secured to the sleeve 20 by means of the nut 33, this nut being externally threaded to engage internal threads on the cylinder 32 and being internally threaded to engage external threads on the sleeve 20. A set-screw 34 serves to lock the nut 33 against rotation on the sleeve 20. The draw rod 23 is of reduced diameter adjacent its outer end to provide a shoulder which forms a seat for the end wall of the piston 35 which is reciprocable in the cylinder 32. The reduced portion of the draw-rod 23 is threaded for a part of its length and the piston 35 is secured on the draw rod against movement relative thereto by means of a nut 37 which is threaded on this reduced end portion and a washer 38 interposed between the nut 37 and the outer face of the piston. Preferably, a leather cup or washer 39 is interposed between the washer 38 and the outer face of the piston to prevent leakage of the fluid used to move the piston, as will be described more particularly hereinafter, along the side walls of the cylinder between the piston and the cylinder. The draw rod 23 passes through the washer 40 which is provided with a sleeve or stem portion seating within the sleeve 20 and forming with reference to the head of the washer, a shoulder seating against the end of the sleeve 20. The piston 35 is of cup shape so as to reduce the compass of the cylinder 32 and surrounding the draw-rod 23 and interposed between the inner end face of the piston and the washer 40 is a heavy coiled spring 42. As is evident, the spring 42 serves to constantly urge the piston 35 rearwardly in the cylinder 32 thus forcing the draw rod 23 rearwardly in the sleeve 20. This spring 42 is made of sufficient strength to move the draw rod to and maintain it normally in chucking position with the gear G clamped against the arbor 22 by the nut or other retaining member 24.

During cutting, then, the gear blank G to be generated is securely held against movement relative to the sleeve 20 by means of the draw rod 23, the retaining member 24, the piston 35 and the coil spring 42. After the gear has been cut or when for any other reason it is desired to take the gear blank off the machine, the draw rod 23 must be moved forward against the resistance of the spring 42 sufficiently far to permit easy removal of the retaining member 24. For this purpose, I use a hydraulic medium, as it has been found that this medium permits of a simple centralized control and has sufficient flexibility to permit of the chucking mechanism being used on a machine of universal character on which gears of many different cone angles and cone distances are to be cut. I will next describe, therefore, the means for exerting fluid pressure against the outer face of the piston 35 to force the same forward against the resistance of the spring 42 to move the draw rod 23 to released position.

Secured within a hole bored in the end of the cylinder 32, as by means of a nut 45, is a stud 46. This stud 46 is drilled centrally at 47 for a portion of its length and diametrically at 48 to provide a passage for a fluid into the chamber of the cylinder 32 where the fluid can act against the outer end face of the piston 35. Secured to the base or frame 10 of the machine at any convenient point is a bracket 50 provided with a pair of arms 51 and 52 between which is pivotally mounted a pump cylinder 53. This pump cylinder 53 is connected at its lower end through a suitable coupling 54 with a T-coupling 55.

Threaded into the leg of the T-coupling 55 is a coupling 56 to which is secured a length of flexible piping 57. The hose 57 is secured at its other end to an elbow 58 which is threaded into a sleeve 59 that is rotatably mounted on the stud 46. The sleeve 59 is drilled at 60 and provided with an annular groove registering with the hole 60 and with the hole 48 drilled in the stud 46 so that the fluid used can flow from the piping 57 through the hole 60 drilled in the sleeve 59 into the hole 48 drilled in the stud 46 and thence through the communicating hole 47 drilled in the stud 46 into the chamber of the cylinder 32. A pair of cup washers 62 are arranged, as clearly shown in Figure 2, between the sleeve 59 and the stud 46 to prevent any possible leakage of the fluid along the stud.

The pump cylinder 53 is provided with a piston or plunger 65 which is reciprocable in the pump cylinder. A suitable packing such as the leather cup 66, held in position by the cap 68 is provided to prevent leakage of the liquid medium used from the pump cylinder along the piston or plunger 65. The cap can be secured in position by screws 69.

The cylinder 32, piping 57, and the pump cylinder 53 together with the necessary connections between these members constitute a substantially closed system filled with a suitable liquid such as oil. It will be seen, then, that when the plunger 65 is depressed in the pump cylinder 63, the liquid in the pump cylinder will be forced out of the pump cylinder and the liquid will be forced into the chamber of the cylinder 32 to force the piston 35 forward in that cylinder against the resistance of the spring 42 and release the draw rod 23. The spring 42 is made of sufficient strength that when the plunger 65 is released, the liquid will be forced out of the cylinder 32 and the column of liquid will again rise in the pump cylinder to force the plunger 65 to its outer position shown in Figure 2.

In the embodiment of the invention illustrated, a simple manually operable means has been provided for actuating the pump plunger 65. This comprises a lever arm 70 which is pivotally mounted upon a stud secured to the frame of the machine and which has a pivotal connection at 71 with the pump plunger 65. A lug 72 formed on the lever arm 70 serves to limit movement of the lever arm outwardly by contact with the arm 52 of the pump bracket 50. Because the pump plunger 65 is pivoted to the lever arm 70 eccentrically of the pivotal mounting of this lever arm, very little exertion is required on the part of the operator to depress the pump plunger and move the draw rod to released position. As long as the pump plunger is depressed, the draw rod will be held in released position, but when the operator releases the lever arm 70, the pump cylinder 53 will be again filled with oil and the plunger and lever arm 70 again moved to their outer positions shown in Figure 2 ready for a subsequent operation.

While a manually operable means has been described for actuating the pump plunger it will be understood that, if desired, the pump plunger might be connected with an automatic control device or directly with a cam or other means operated by the machine so it can be automatically operated.

Despite the various packings provided to prevent leakage, it is impossible to prevent altogether all leakage from the system. As the liquid leaks out of the system, the pressure which can be exerted on the piston 35 by depressing of the plunger 65 will be decreased and if the volume in the system were to fall below a certain minimum it would be no longer possible to move the draw rod to released position. One feature of this invention is the provision of means for keeping at all times a working volume of liquid in the system.

The lower arm of the T-coupling 55 is connected with a suitable source of fluid supply by means of the coupling 75 and the flexible piping 76. This connection is controlled by a suitable check valve as the ball check valve 78. Preferably, the hose 76 will be connected to the lubricating oil pump of the machine. The lubricating oil pump is constantly pumping oil to the various parts of the machine which require lubrication and there will be a certain pressure in this lubricating oil system. As long as there is a working volume of oil in the chucking system, the check valve 78 will remain closed, but as soon as the volume of oil in the chucking system falls below the working minimum, the pressure of oil in the lubricating system will force the check valve 78 open to refill the chucking system. The check valve 78 will be re-seated when the plunger 65 is depressed and will remain closed until the volume of oil in the system again falls so low that the pressure in the lubricating system reopens it.

Where it is not feasible to connect the chucking system with the lubricating oil system of the machine, it is within the contemplation of this invention to connect the chucking system with the cutting oil pump which supplies the coolant for cutting. In other cases, as where a gravity lubricating system is used, the chucking system may be connected to the oil reservoir in the upper portion of the machine. If the force of gravity is not sufficient to open the check valve when the volume of fluid in the chucking system falls below the working minimum, the effect of gravity may be augmented by moving the lever arm 70 beyond its normal upper position to assist in opening the check valve 78 by suction. In fact, the check valve can be arranged to be opened simply by suction so that the operator can replenish the chucking system by a simple up stroke of the plunger 65 whenever he finds that the volume of liquid in the chucking system has fallen below the working minimum. The check valve 78 can, therefore, be automatically or manually operated to maintain the necessary working volume of fluid in the chucking system.

The operation of my improved chuck will be understood from the preceding description. It may be briefly summed up here, however. The spring 42 acting on the piston 35 serves to move the draw rod 23 to and maintain it normally in chucking position. When it is desired to release the blank, the lever arm 70 will be depressed closing the check valve 78 and forcing the liquid in the pump cylinder 53 out of the pump cylinder into the piping 57 forcing the piston 35 forward against the resistance of the spring 42. As soon as the pressure on the lever arm 70 is released, the spring 42 acts to return the piston 35 and draw rod 23 to chucking position, forcing the liquid out of the cylinder 32, refilling the pump cylinder 53 and forcing the plunger 65 and lever arm 70 to their outer position. When, for any reason, the amount of fluid in the system falls below a predetermined working minimum, the system will be replenished by opening the check valve 78 which may be effected automatically or manually or through a combination of automatic and manually operable means as previously described.

Because the chucking mechanism is fluid pressure operated in its releasing movement, and because the pump cylinder 53 can be mounted in any desired position on the machine and connected through a flexible hose with the chuck cylinder 32, the chuck can be operated regardless of the angular position of adjustment of the blank, so that the present chucking mechanism can be used on a machine for cutting gears of any desired size and is hence capable of more universal use than the chucking mechanism described in Patent No. 1,656,625 issued to myself and Schuyler H. Earl jointly on January 17, 1928. Through the rotatable coupling provided by the sleeve 59 with the stud 46, the blank can freely partake of the rolling movement required in a gear generating machine of the character illustrated in the present drawings without interference with or on the part of the chucking mechanism.

While the present invention has been described in connection with the machine for generating gears, it is not intended to limit the invention to this use, but it may be employed on any form of machine tool. In general, it may be said, that while I have described a preferred embodiment of my invention, the invention is capable of further modification and use and that this application is intended to cover any variations, uses, or adaptations of the invention, following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The combination with a chuck provided with means for actuating it into chucking position, of fluid pressure operated means for releasing it comprising a piston connected to said chuck, a cylinder in which said piston is movable, a pump, piping connecting said pump with said cylinder, said cylinder, piping and pump constituting a substantially closed system adapted to contain a substantially constant volume of fluid, and means for actuating the pump to force the fluid out of the pump chamber into the first named cylinder to move the chuck to released position.

2. The combination with a chuck provided with spring means for actuating it into chucking position, of fluid pressure operated means for releasing it comprising a piston connected to said chuck, a cylinder in which said piston is movable, a pump cylinder having a plunger reciprocable therein, piping connecting the pump with the first named cylinder, said cylinder, piping and pump constituting a substantially closed system containing a substantially constant volume of fluid, whereby when the plunger is depressed in the pump cylinder the fluid is forced into the first named cylinder to move the chuck to released position and when the plunger is released, the spring returns the chuck to chucking position and, through the fluid, forces the plunger to outer position.

3. The combination with a chuck provided with spring means for actuating it into chucking position, of fluid pressure operated means for releasing it comprising a piston connected to said chuck, a cylinder in which said piston is movable, a pivotally mounted pump cylinder having a plunger reciprocable therein, a lever for reciprocating said plunger pivoted to the plunger and mounted for pivotal movement about a center eccentric to its pivotal connection with the plunger, piping connecting the pump cylinder with the first named cylinder, said cylinder, piping and pump constituting a substantially closed system adapted to contain a substantially constant volume of fluid, whereby when the plunger is depressed in the pump cylinder, the fluid is forced into the first named cylinder to move the chuck to released position and when the plunger is released, the spring returns the chuck to chucking position and, through the fluid, returns the plunger to its outer position.

4. The combination with a chuck provided with means for actuating it into chucking position, a fluid pressure operated means for releasing it comprising a piston connected to said chuck, a cylinder in which said piston is movable, a pump cylinder, piping connecting the pump cylinder with said first named cylinder, said cylinder, piping and pump constituting a substantially closed system adapted to contain a substantially constant volume of fluid, means for actuating the pump to force the fluid out of the pump cylinder into the first named cylinder to move the chuck into released position and means operable to admit fluid to said system when the volume of fluid in the system falls below a predetermined minimum.

5. The combination with a chuck provided with means for actuating it into chucking position of fluid pressure operated means for releasing it comprising a piston connected to said chuck, a cylinder in which said piston is movable, a pump cylinder, piping connecting the pump cylinder with said first named cylinder, said cylinder, piping and pump constituting a substantially closed system adapted to contain a substantially constant volume of fluid, means for actuating the pump, and means operable automatically to admit fluid to said system when the volume of fluid in the system falls below a predetermined minimum.

6. The combination with a chuck provided with means for actuating it into chucking position, of fluid pressure operated means for releasing it comprising a piston connected to said chuck, a cylinder in which said piston is movable, a pump cylinder, piping connecting the pump cylinder with the first named cylinder on the said cylinder, piping and pump constituting a substantially closed system adapted to contain a substantially constant volume of fluid, means for actuating the pump, and valve controlled means whereby fluid may be admitted to the system when the volume of fluid within the system falls below a predetermined minimum.

7. The combination with a chuck provided with means for actuating it into chucking position, of fluid pressure operated means for releasing it comprising a piston connected to said chuck, a cylinder in which said piston is movable, a pump cylinder, piping connecting the pump cylinder with the first named cylinder, said cylinder, piping and pump constituting a substantially closed system adapted to contain a substantially constant volume of fluid, means for actuating the pump, and means both manually and automatically operable to admit fluid to said piston when the volume of fluid in said piston falls below a predetermined minimum.

8. The combination with a chuck provided with spring means for actuating it into chucking position, of fluid pressure operated means for releasing it comprising a piston connected to said chuck, a cylinder in which said piston is movable, a pump cylinder and having a plunger reciprocable therein, piping connecting the pump cylinder with the first named cylinder, said pump cylinder, piping, and first named cylinder constituting a substantially closed system adapted to contain a substantially constant volume of fluid whereby when the plunger is depressed in the pump cylinder fluid is forced into the first named cylinder to move the chuck to released position and when the plunger is released, the spring returns the chuck to operative position, and through the fluid, the plunger to outer position, and a valve controlled connection between said system and a source of fluid supply whereby when the amount of fluid in the system falls below a predetermined minimum, additional fluid may be admitted to said system.

9. The combination with a chuck provided with spring means for actuating it into chucking position of fluid pressure operated means for releasing it comprising a piston connected to said chuck, a cylinder in which said piston is movable, a pivotally mounted pump cylinder having a plunger reciprocable therein, a lever for reciprocating said plunger pivoted to said plunger and mounted for pivotal movement about a center eccentric to its pivotal connection with the plunger, piping connecting the pump cylinder with the first named cylinder, said pump cylinder, piping and the first named cylinder constituting a substantially closed system adapted to contain a substantially constant volume of fluid whereby when the plunger is depressed in the pump cylinder, the fluid is forced into the first named cylinder to move the chuck to released position and when the plunger is released the spring returns the chuck to chucking position, and, through the fluid, moves the plunger to outer position, and a valve controlled connection between said piston and a source of fluid supply on the machine whereby additional fluid may be admitted to the system when the volume of fluid in the system falls below a predetermined minimum.

10. The combination with a chuck provided with means for actuating it into chucking position, of fluid pressure operated means for releasing it comprising a piston connected to said chuck, a cylinder in which said piston is movable, a pump, piping connecting the pump to said cylinder, said cylinder, piping, and pump constituting a substantially closed system adapted to contain a substantially constant volume of fluid, and means for actuating the pump.

11. The combination with a chuck provided with means for actuating it into chucking position, of fluid pressure operated means for releasing it comprising a piston connected to said chuck, a cylinder in which said piston is movable, a pump, piping connecting the pump to said cylinder, said cylinder, piping, and pump constituting a substantially closed system adapted to contain a substantially constant volume of fluid, means for actuating said pump, and valve controlled means for supplying fluid to said system whereby the volume of fluid in the system may be maintained above a predetermined minimum.

12. The combination with a chuck provided with means for actuating it into chucking position, of fluid pressure operated means for releasing it comprising a piston connected to said chuck, a cylinder in which said piston is movable, a pivotally mounted pump having a plunger reciprocable therein, a lever for reciprocating said plunger pivoted to the plunger and mounted for pivotal movement about a center eccentric to its pivotal connection with the plunger and piping connecting the pump cylinder to the first named cylinder, said first named cylinder, piping and pump cylinder constituting a substantially closed system adapted to contain a substantially constant volume of fluid, and valve controlled means for admitting fluid to said system when the volume of fluid in said system falls below a predetermined minimum.

13. The combination with a chuck provided with means for actuating it into chucking position, of fluid pressure operated means for releasing it comprising a piston connected to said chuck, a cylinder in which said piston is movable, a pivotally mounted pump cylinder having a plunger reciprocable therein, a lever for reciprocating said plunger pivoted to the plunger and mounted for pivoted movement about a center eccentric to its pivotal connection with the plunger, flexible piping connected at one end with the pump cylinder and at the other end with a member journaled on the first named cylinder, said member and first named cylinder being provided with openings adapted to register in any position of relative rotation between said member and cylinder, whereby fluid may be admitted to the first named cylinder whatever the relative position of said cylinder, said first named cylinder, pump cylinder and the connection therebetween constituting a substantially closed system adapted to contain a substantially constant volume of fluid and valve controlled means for admitting fluid to said system when the volume of fluid within the system falls below a predetermined minimum.

EYVIND FINSEN.